(12) United States Patent
Brownjohn et al.

(10) Patent No.: US 9,033,594 B2
(45) Date of Patent: May 19, 2015

(54) METHOD FOR CONNECTING AN OPTICAL WAVEGUIDE, EMBEDDED IN A FIBRE COMPOSITE COMPONENT, TO AN EXTERNAL OPTICAL WAVEGUIDE

(75) Inventors: Nicholas E. Brownjohn, Buxtehude (DE); Stefan Osternack, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 27 days.

(21) Appl. No.: 13/814,698

(22) PCT Filed: Aug. 9, 2011

(86) PCT No.: PCT/EP2011/063655
§ 371 (c)(1),
(2), (4) Date: May 20, 2013

(87) PCT Pub. No.: WO2012/020007
PCT Pub. Date: Feb. 16, 2012

(65) Prior Publication Data
US 2013/0301997 A1 Nov. 14, 2013

Related U.S. Application Data

(60) Provisional application No. 61/372,316, filed on Aug. 10, 2010.

(30) Foreign Application Priority Data

Aug. 10, 2010 (DE) .......................... 10 2010 039 153

(51) Int. Cl.
*G02B 6/255* (2006.01)
*G02B 6/36* (2006.01)
*G02B 6/38* (2006.01)

(52) U.S. Cl.
CPC ............ *G02B 6/2553* (2013.01); *G02B 6/2551* (2013.01); *G02B 6/3608* (2013.01); *G02B 6/3664* (2013.01); *G02B 6/3897* (2013.01); *G02B 6/255* (2013.01)

(58) Field of Classification Search
CPC ..... G02B 6/3897; G02B 6/255; G02B 6/2551
USPC ......................................... 385/95–99, 31–32
See application file for complete search history.

(56) References Cited

U.S. PATENT DOCUMENTS 4,201,815 A 5/1980 Weiland et al.
4,584,226 A 4/1986 Vitale et al.
(Continued)

FOREIGN PATENT DOCUMENTS

DE 2757965 6/1979
DE 10102853 8/2002
(Continued)

OTHER PUBLICATIONS

International Search Report, Nov. 21, 2011.
(Continued)

*Primary Examiner* — Ellen Kim
(74) *Attorney, Agent, or Firm* — Greer, Burns & Crain Ltd.

(57) ABSTRACT

A method for connecting an optical waveguide embedded in a fiber composite component, in particular of an aircraft and spacecraft, to an external optical waveguide, comprising the following steps: ascertaining a path of the embedded optical waveguide in the fiber composite component; determining a nodal position at which the embedded optical waveguide is to be coupled with the external optical waveguide; exposing, at least in portions, the embedded optical waveguide at the nodal position by removing at least part of the fiber composite component around the embedded optical waveguide; severing the exposed embedded optical waveguide; aligning relative to each other an end portion of the severed, embedded optical waveguide and an end portion of the external optical waveguide; and splicing the mutually aligned end portions of the optical waveguides.

14 Claims, 9 Drawing Sheets

(56) References Cited

U.S. PATENT DOCUMENTS

| | | | |
|---|---|---|---|
| 4,622,254 A | 11/1986 | Nishimura et al. | |
| 5,355,429 A | 10/1994 | Lee et al. | |
| 5,732,046 A * | 3/1998 | O'Donnell et al. | 367/149 |
| 6,952,505 B2 * | 10/2005 | Aldridge et al. | 385/14 |
| 7,542,632 B2 * | 6/2009 | Menendez Martin | 385/12 |
| 2002/0136498 A1 | 9/2002 | Aldridge et al. | |
| 2005/0047725 A1 | 3/2005 | Ahrens | |
| 2005/0259909 A1 | 11/2005 | Aldridge et al. | |
| 2007/0122098 A1 | 5/2007 | Menendez Martin | |
| 2007/0122099 A1 | 5/2007 | Menendez et al. | |
| 2007/0201808 A1 | 8/2007 | Bannister et al. | |
| 2008/0156971 A1 * | 7/2008 | Ogisu et al. | 250/227.14 |
| 2010/0202737 A1 | 8/2010 | Saunders | |

FOREIGN PATENT DOCUMENTS

| | | |
|---|---|---|
| DE | 102007030025 | 10/2008 |
| EP | 1962123 | 8/2008 |
| FR | 2412782 | 7/1979 |
| GB | 2274178 | 7/1994 |
| GB | 2448537 | 10/2008 |
| WO | 2005103786 | 11/2005 |

OTHER PUBLICATIONS

German Office Action, Feb. 7, 2011.
European Office Action, Dec. 4, 2013.
European Office Action, Jul. 8, 2014.
German Office Action, Oct. 13, 2011.
European Search Report, Mar. 12, 2014

* cited by examiner

METHOD FOR CONNECTING AN OPTICAL WAVEGUIDE, EMBEDDED IN A FIBRE COMPOSITE COMPONENT, TO AN EXTERNAL OPTICAL WAVEGUIDE

CROSS-REFERENCES TO RELATED APPLICATIONS

This application claims the benefit of the U.S. Provisional Application No. 61/372,316, filed on Aug. 10, 2010, and of the German patent application No. 10 2010 039 153.0 filed on Aug. 10, 2010, the entire disclosures of which are incorporated herein by way of reference.

FIELD OF THE INVENTION

The present invention relates to a method for connecting an optical waveguide, embedded in a fibre composite component, in particular of an aircraft and spacecraft, to an external optical waveguide.

Although the present invention can be applied to any fibre composite components, it will be described with respect to a fibre composite component of an aircraft and spacecraft.

BACKGROUND OF THE INVENTION

Due to the large number of cables which are required and corresponding cable clips, cable forms of aircraft and spacecraft are of an extremely complex construction and are heavy. Furthermore, a later expansion of the cable form or a modular construction thereof is difficult to realise. The design process for laying such a cable form is time-consuming, complex and very susceptible to errors. Customer-specific adaptations and requirements can only be realised where a considerable constructive complexity is involved.

In aircraft and spacecraft, optical waveguides embedded in fibre composite components are used to monitor damage. WO 2007/063145 A1 describes a fibre composite structure with an optical fibre which is embedded at least in portions in the fibre composite structure and is used for monitoring damage of the fibre composite structure. However, such embedded optical waveguides are also suitable for transmitting data. A problem, however, of embedded optical waveguides is the connection thereof to external optical waveguides which are not embedded in the fibre composite component, for example for connecting the embedded optical waveguide to an optical waveguide plug connection.

Accordingly, U.S. Pat. No. 7,039,276 B2 describes a method and a device for coupling a first optical transmission means, for example an optical fibre, which is embedded in a fibre composite component of an aircraft and spacecraft, with a second optical transmission means such as an optical fibre which is arranged outside the fibre composite component. The method comprises: determining the position of the first optical element which is embedded in the composite component, for example by means of radioscopy; forming an opening by laser beam machining or drilling into the composite component up to the first optical transmission means; and producing an optical connection between the first and second optical transmission means at the interface of the opening and the first optical transmission means. However, a disadvantage of this arrangement is that it is difficult to sever in a controlled manner the embedded optical transmission means due to the simultaneous severing of the fibre composite component and the first optical transmission means. Consequently, it is necessary to finish the embedded optical waveguide after severing to obtain a satisfactory optical connection to the external optical waveguide. This implies an enormous production expense and increases the reject rate. Therefore, the method cannot be used on an industrial scale.

SUMMARY OF THE INVENTION

Accordingly, a method for connecting an optical waveguide, embedded in a fibre composite component, in particular of an aircraft and spacecraft to an external optical waveguide is provided, which comprises the following steps: ascertaining a path of the embedded optical waveguide in the fibre composite component; determining a nodal position at which the embedded optical waveguide is to be coupled with the external optical waveguide; exposing, at least in portions, the embedded optical waveguide at the nodal position by removing at least part of the fibre composite component from around the embedded optical waveguide; severing the exposed embedded optical waveguide; aligning relative to each other an end portion of the severed, embedded optical waveguide and an end portion of the external optical waveguide; and splicing the mutually aligned end portions of the optical waveguides.

Thus, with the present method it is possible first of all to expose the embedded optical waveguide in a controlled manner and, in a subsequent step, to sever the optical waveguide cleanly. This makes it possible to ensure a reproducible and constant quality of the severed point of the embedded optical waveguide, as a result of which it is possible to produce a reliable connection to the external optical waveguide.

Advantageous configurations and developments of the present invention are provided in the subclaims and in the description combined with the figures of the drawings.

According to a preferred development of the method according to the invention, the path of the embedded optical waveguide in the fibre composite component is ascertained non-destructively, in particular by an optical method, a digital shearography method, an ultrasound method, an X-ray method, an interferometric method or the like. Consequently, it is possible to ascertain the position of the embedded optical waveguide in the fibre composite component in a rapid, automatable and reliable manner.

According to a further preferred development of the method according to the invention, the embedded optical waveguide is exposed, at least in portions, by a method which only strips the fibre composite component and does not exert a stripping effect on the embedded optical waveguide, thereby preventing the embedded optical waveguide from being damaged during exposure.

According to a further preferred development of the method according to the invention, the exposure, at least in portions, of the embedded optical waveguide is carried out by laser irradiation, in particular by infrared laser irradiation. This allows the embedded optical waveguide to be exposed in a rapid and reproducible manner, thereby enhancing the reliability of the method according to the invention.

According to a further preferred development of the method according to the invention, the exposed embedded optical waveguide is severed vertically to a centre axis of the embedded optical waveguide, thereby allowing a reliable and long-lasting spliced connection with the external optical waveguide. This enhances the reliability of the method according to the invention.

According to a preferred development of the method according to the invention, the exposed embedded optical waveguide is severed by laser irradiation, in particular by ultraviolet laser irradiation. In this manner, it is possible for the embedded optical waveguide to be severed rapidly without the use of a contacting tool, as a result of which the processing time of the method is advantageously reduced.

According to a further preferred development of the method according to the invention, the end portion of the severed, embedded optical waveguide and the end portion of the external optical waveguide are aligned relative to each other such that the centre axes of the end portions are arranged collinearly to each other and the end faces of the end portions are in contact with each other, thereby ensuring an optimal alignment of the end portions relative to each other.

According to a development of the method according to the invention, when the end portion of the severed, embedded optical waveguide and the end portion of the external optical waveguide are aligned relative to each other, a beam of light is fed into one of the optical waveguides, which light beam is at least partly reflected at an interface of the optical waveguides which is formed by the end faces of the end portions, and when the end portions of the optical waveguides are aligned optimally relative to each other, a minimum reflection of the light beam occurs at the interface. Consequently, a rapid and reliable check of the alignment of the end portions of the optical waveguides is ensured, thereby increasing the production reliability.

According to a further preferred development of the method according to the invention, the end portions of the optical waveguides are aligned relative to each other by an alignment tool, in particular by a substrate with a V-shaped groove which receives at least in portions the at least one of the end portions of the optical waveguides. This allows a particularly precise alignment of the end portions relative to each other, thereby enhancing the quality of the connection to be produced.

According to a preferred development of the method according to the invention, the mutually aligned end portions of the optical waveguides are spliced by fusion splicing. This provides a high-quality and mechanically loadable join between the optical waveguides.

According to a further preferred development of the method according to the invention, the embedded optical waveguide and/or the external optical waveguide are configured as optical fibres and/or as an arrangement of a large number of optical fibres. This advantageously allows the optical waveguide to be laid in a flexible manner, thereby expanding the range of applications of the method.

According to a yet further preferred development of the method according to the invention, the embedded optical waveguide is woven into a laminate layer of the fibre composite component. This makes it possible for the optical waveguide to be processed in a particularly simple manner and simplifies the producibility of the fibre composite component.

BRIEF DESCRIPTION OF THE DRAWINGS

In the following, the invention will be described in more detail on the basis of embodiments with reference to the accompanying figures of the drawings.

In which.

In the figures, the same reference numerals denote identical or functionally identical components, unless indicated otherwise.

DETAILED DESCRIPTION OF THE PREFERRED EMBODIMENTS

A preferred embodiment of the present invention is described in the following, while referring simultaneously to FIGS. 1 to 9.

Figure 1:
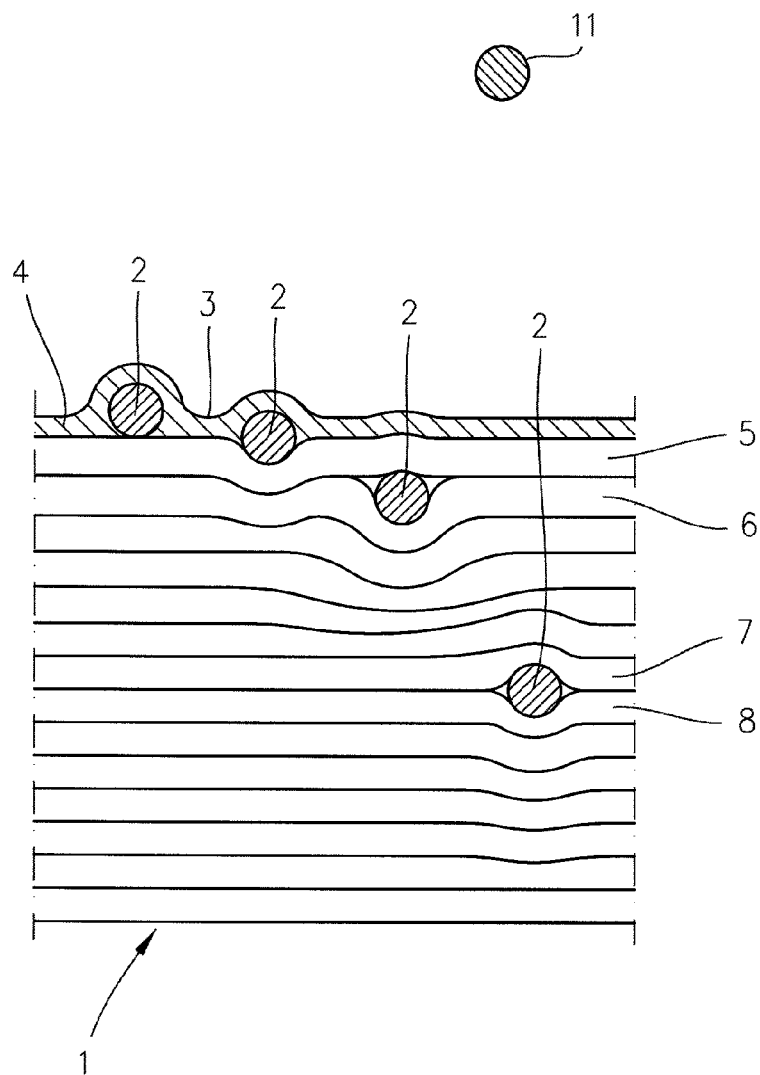
FIG. 1 is a partial sectional view of a fibre composite component.

FIG. 1 illustrates a preferred embodiment of a fibre composite component 1 which is configured, for example, as a structural element 1 of an aircraft and spacecraft. The structural element 1 is configured, for example as a stringer 1, a former 1, a crossbar 1 or the like of the aircraft and spacecraft. The fibre composite component 1 is preferably formed from a carbon fibre-reinforced plastics material (CFRP). Alternatively or additionally, the fibre composite component 1 can be formed from glass fibres, aramid fibres and/or boron fibres or a combination of these materials. The fibre composite component 1 preferably has a large number of laminate plies or laminate layers, only laminate layers 5-8 of which having been provided with a reference numeral. There can be any number of laminate layers 5-8. A laminate layer 5-8 is configured in each case as, for example fibrous tissue, fibre-woven fabric, different types of fibre-knitted fabrics or the like, impregnated with a matrix material. The laminate layers 5-8 preferably contact one another extensively.

The fibre composite component 1 preferably has an embedded optical waveguide 2 shown in a sectional view in FIG. 1. The embedded optical waveguide 2 has a circular cross-sectional shape, for example. The embedded optical waveguide 2 can be configured, for example as embedded optical fibres 2 or as an arrangement 10, illustrated in FIG. 2, of a large number of optical fibres 2. The embedded optical waveguide 2 is preferably introduced into a fibre composite component 1 during the production process of said fibre composite component 1. The embedded optical waveguide 2 preferably runs over an entire longitudinal, transversal, or thickness extension of the fibre composite component. For example, the fibre composite component 1 comprises a large number of optical waveguides 2 which run in particular in different planes and directions through the fibre composite component 1. The embedded optical waveguide 2 can be bound, for example to a surface 3 of the fibre composite component 1 and covered only by a fixing cover layer 4 or matrix layer 4 of the fibre composite component 1 (FIG. 1, first optical waveguide 2 from the left). Furthermore, the optical waveguide 2 can be embedded at least in portions in the surface 3 or in a laminate layer 5 of the fibre composite component 1 and covered by the matrix layer 4 (FIG. 1, second optical waveguide 2 from the left). Furthermore, the embedded optical waveguide 2 can be embedded in the fibre composite component 1 between the laminate layers 5, 6 which are near the surface (FIG. 1, third optical waveguide 2 from the left). The embedded optical waveguide 2 can be embedded, for example between deep laminate layers 7, 8 of the fibre composite component 1. The embedded optical waveguide 2 can be arranged, for example in the respective laminate layer 5-8, in particular the embedded optical waveguide 2 can be configured as an integral component of the respective laminate layer 5-8. Arranged outside the fibre composite component 1 is an external optical waveguide 11, in particular an external optical fibre 11 or an arrangement of a large number of external optical fibres 11.

Figure 2:
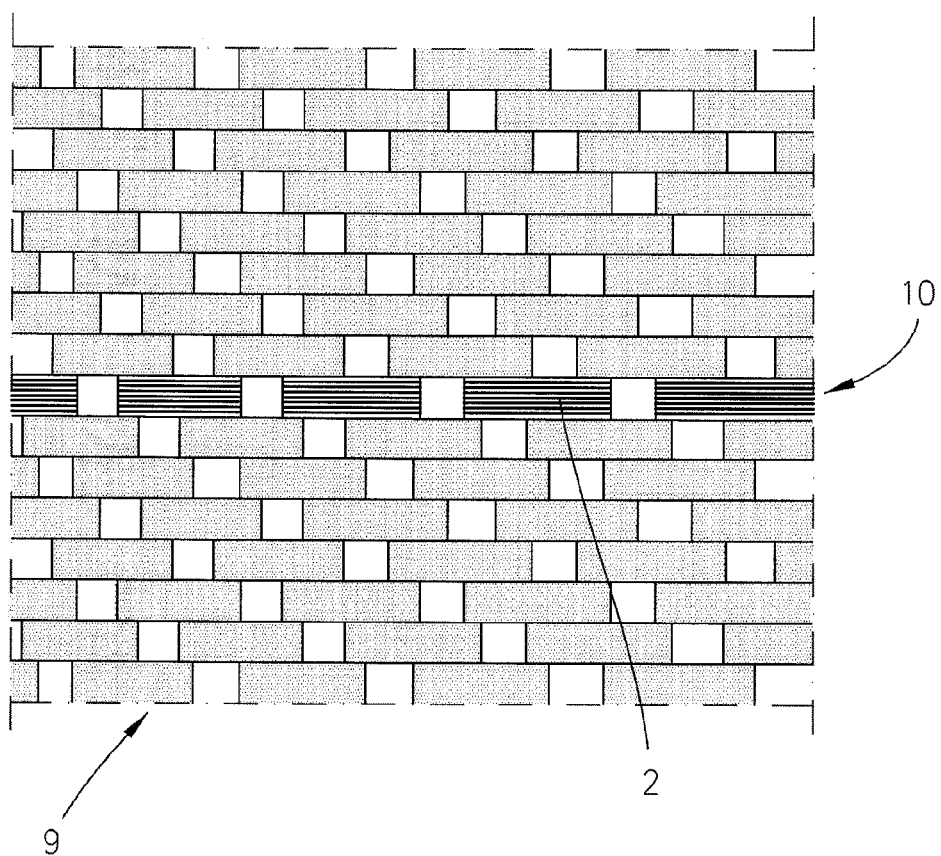
FIG. 2 is a plan view of a fibrous tissue with an optical waveguide.

FIG. 2 is a plan view of an exemplary embodiment of a fibrous tissue 9, in particular a carbon fibre tissue 9. The fibrous tissue 9 preferably comprises the embedded optical waveguide 2. The embedded optical waveguide 2 is, for example woven into the fibrous tissue 9 as embedded optical fibres 2 or according to FIG. 2 as an arrangement 10 or array 10 of a large number of embedded optical fibres 2. In particular, the embedded optical waveguide 2 is configured integrally with the fibrous tissue 9 and is preferably introduced into said fibrous tissue 9 during the production thereof.

Figure 3:
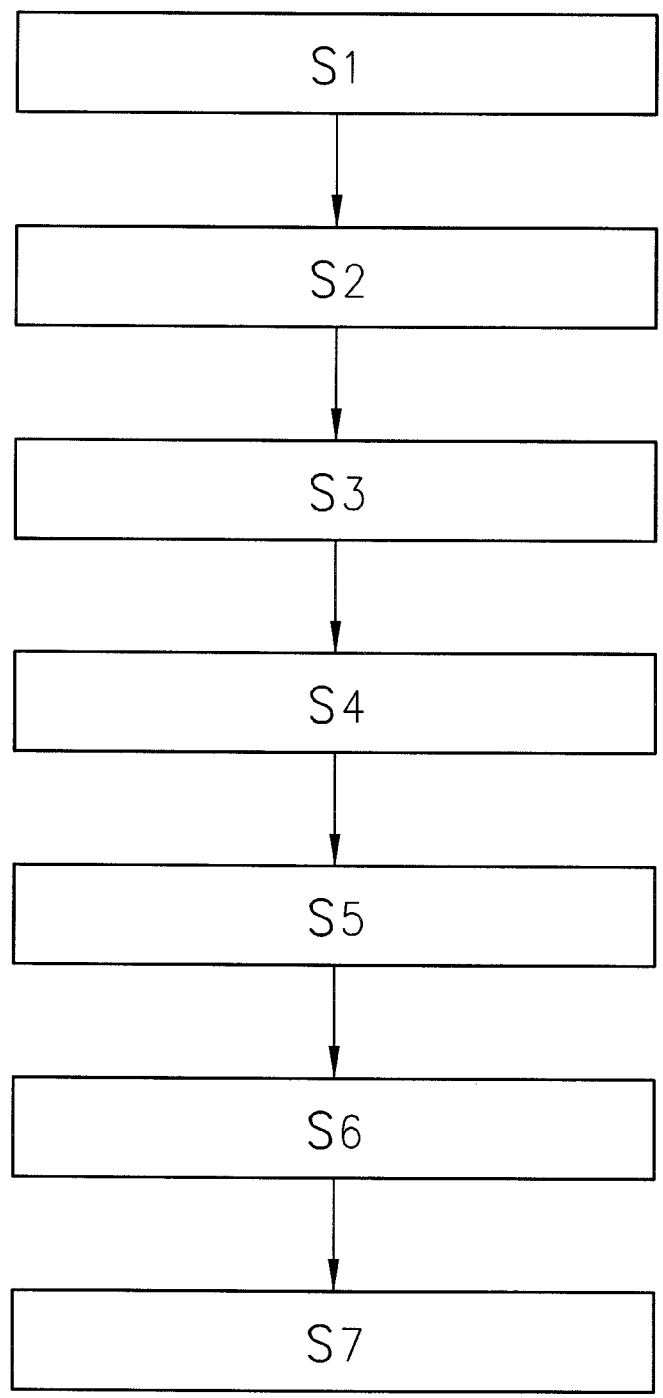
FIG. 3 illustrates a method for connecting an optical waveguide, embedded in a fibre composite component, to an external optical waveguide.

FIG. 3 shows exemplary steps of a preferred embodiment of a method for connecting the optical waveguide 2 embedded in the fibre composite component 1 to the external optical waveguide 11. In a first step of the method S1, the fibre composite component 1 is provided with the embedded optical waveguide 2 and the external optical waveguide 11 is also provided. This comprises, for example a manual, automated and/or part-automated production process of the fibre composite component 1 and of the embedding procedure of the embedded optical waveguide 2 in the fibre composite component 1. Step 1 can also comprise a process for the production of the fibrous tissue 9 with the woven-in optical waveguide 2.

In a step S2, a path of the embedded optical waveguide 2 in the fibre composite component 1 is ascertained. Depending on the position, in particular the depth of the embedded optical waveguide 2 in the fibre composite component 1 according to FIG. 1, for example an optical method, a digital shearography method, an ultrasound method, an X-ray method, an interferometric method or the like is used to determine the path of the optical waveguide 2 embedded in the fibre composite component 1. In so doing, it is essential that the path of the embedded optical waveguide 2 in the fibre composite component 1 is ascertained non-destructively.

Figure 4:
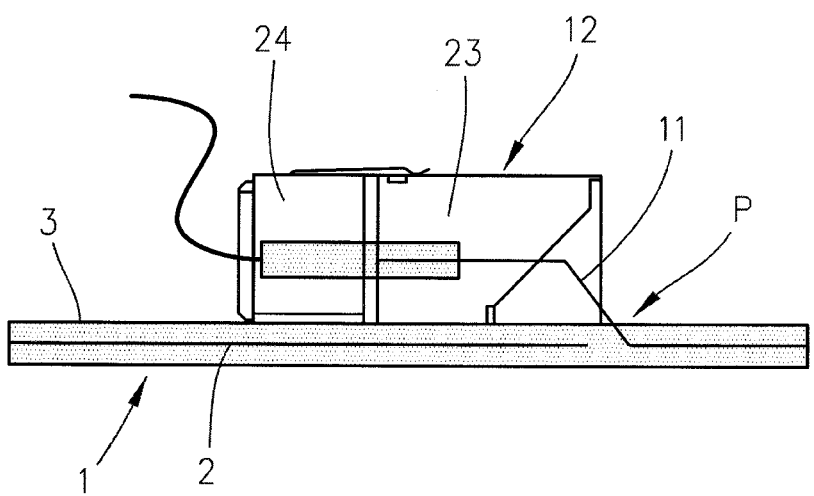
FIG. 4 is a side view of an optical connector mounted on a fibre composite component.

In a step S3, after ascertaining the path of the optical waveguide 2 embedded in the fibre composite component 1, a nodal position P according to FIG. 4 is determined in which the embedded optical waveguide 2 is to be coupled with the external optical waveguide 11. The external optical waveguide 11 is, for example a component of an optical connector 12 which is mounted on the surface 3 of the fibre composite component 1. The optical connector 12 has, for example a socket 23 which is coupled with the fibre composite component 1, in particular is adhesively bonded to the surface 3 and has a plug 24 coupled in a detachable manner with the socket. The location of the nodal position P depends, for example on where information is to be fed into the embedded optical waveguide 2 or where it is to be removed therefrom.

Figure 5:
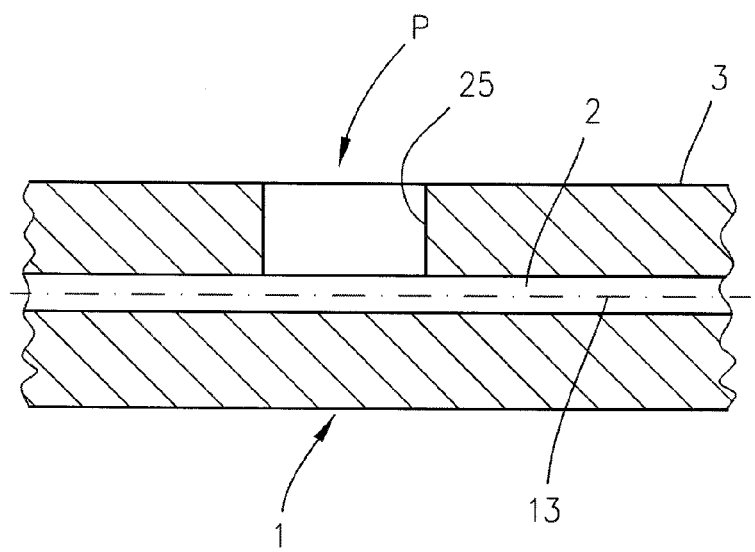
FIG. 5 is a partial sectional view of a fibre composite component with an embedded optical waveguide, at least portions of which have been exposed.
Figure 6:
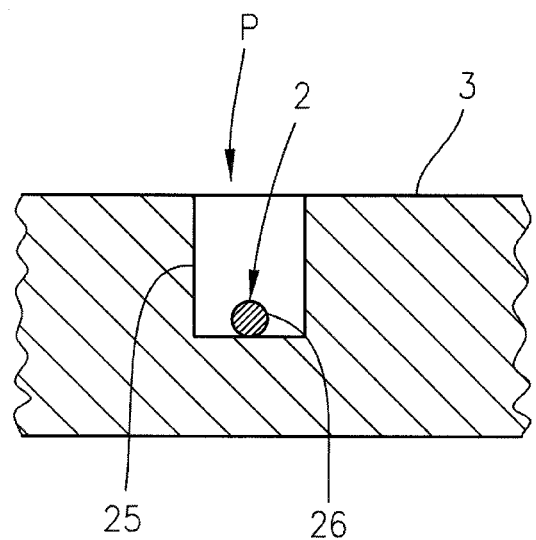
FIG. 6 is a further partial sectional view of a fibre composite component with an embedded optical waveguide, at least portions of which have been exposed.
Figure 7:
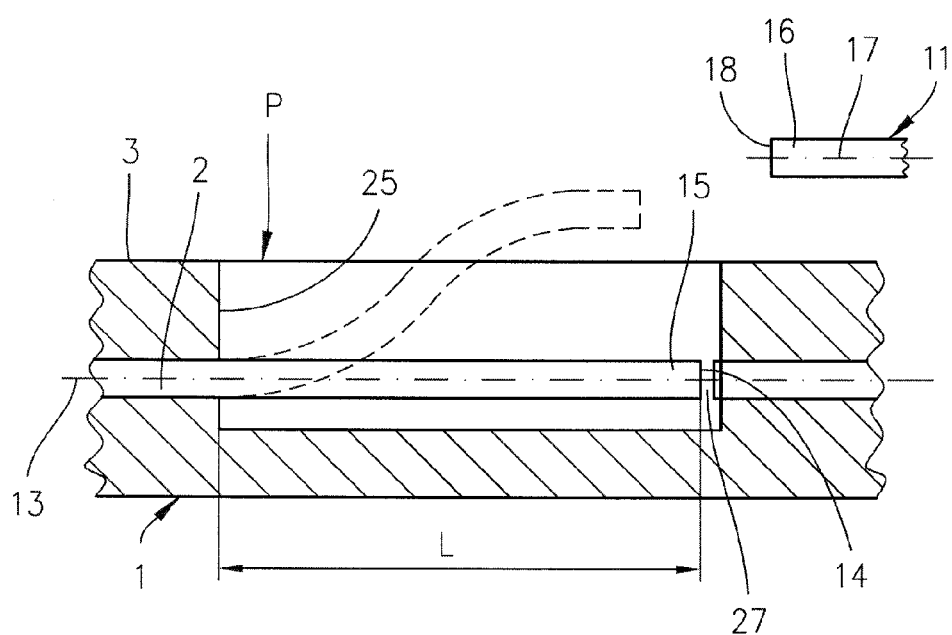
FIG. 7 is a yet further partial sectional view of a fibre composite component with an embedded optical waveguide, at least portions of which have been exposed.
Figure 8:
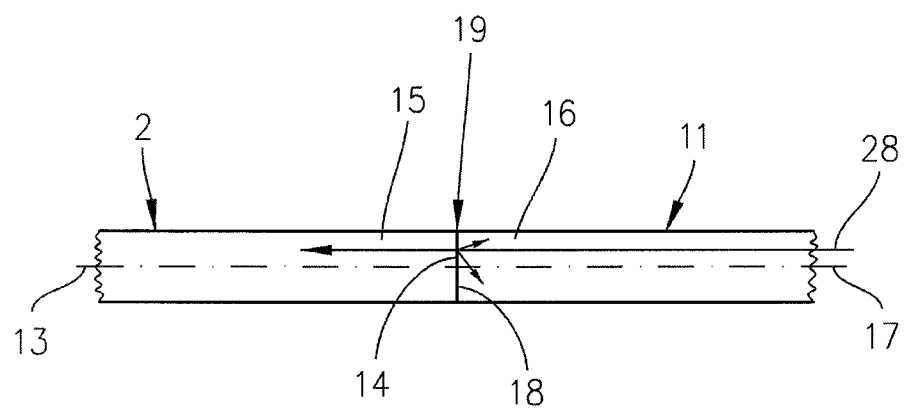
FIG. 8 is a side view of two mutually aligned optical waveguides.
Figure 9:
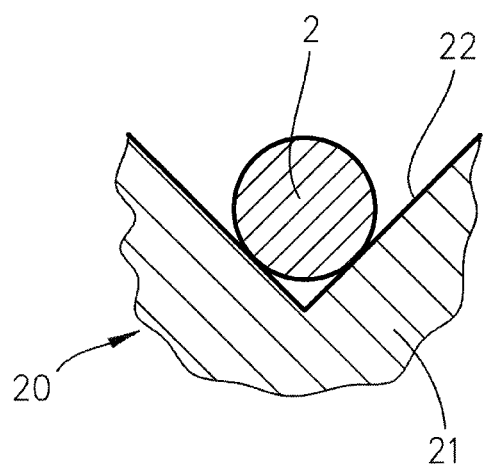
FIG. 9 is a partial sectional view of an alignment tool for aligning two optical waveguides relative to one another.

After the nodal position P has been determined, in a step S4, the embedded optical waveguide 2 is exposed preferably at least in portions in the nodal position P by removing at least part of the fibre composite component 1 around the embedded optical waveguide 2. For this purpose, a recess 25 which extends into the fibre composite component 1 in the direction of the embedded optical waveguide 2 is formed, for example starting from the surface 3. FIGS. 5 and 6 illustrate in a side view and in a sectional view of the embedded optical waveguide 2 the embedded optical waveguide 2 which is exposed at least in portions. In this respect, part of the fibre composite component 1 is removed from around the embedded optical waveguide 2, in other words the embedded optical waveguide 2 rests, for example at least in portions with a periphery 26, in particular with a peripheral surface 26, of the embedded optical waveguide 2 against the fibre composite component 1, in particular against the recess 25. The embedded optical waveguide 2 according to FIG. 7 is preferably freed from the fibre composite component 1 around its entire periphery 26, the recess 25 extending deeper into the fibre composite component 1 than the depth at which the embedded optical waveguide 2 is positioned in the fibre composite component 1. The embedded optical waveguide 2 is preferably exposed at least in portions by a method which only selectively strips the fibre composite component 1 and does not exert a stripping effect on the embedded optical waveguide 2. A process which can be used for exposing the embedded optical waveguide 2 in the fibre composite component 1 is, for example an etching process or a laser process which selectively strips the fibre composite component 1. For example, the embedded optical waveguide 2 can be exposed at least in portions by a carbon dioxide laser device which emits in particular infrared laser irradiation. The laser irradiation is absorbed by the material of the fibre composite component 1 and leads to a controlled ablation of the fibre composite component 1 in a restricted region, for example in the region of the nodal point P, due to the introduction of heat. The infrared irradiation, for example, penetrates the embedded optical waveguide 2 and does not remove any material therefrom. The embedded optical waveguide 2 can thus be exposed without undergoing any damage.

In a step S5, a severing operation, a so-called "cleaving" of the exposed, embedded optical waveguide 2 is carried out. In this respect, the embedded optical waveguide 2 is preferably severed such that the embedded optical waveguide 2 is severed vertically to a centre axis 13 of the embedded optical waveguide 2. The exposed, embedded optical waveguide 2 is severed, for example by laser irradiation. The embedded optical waveguide 2 is preferably severed by ultraviolet laser irradiation, for example by laser irradiation from a helium-cadmium laser device. A wavelength of the laser irradiation has a wavelength range such that the laser irradiation is absorbed by the embedded optical waveguide 2 with the generation of heat in the embedded optical waveguide 2. This produces a cut 27 through the exposed, embedded optical waveguide 2. A length l of the severed, exposed, embedded optical waveguide 2 is preferably configured such that an end portion 15 of the embedded optical waveguide 2 can be bent up without any kinks, for example in the direction of the surface 3 of the fibre composite component 1 and can be guided out of the fibre composite component 1. The length l is preferably calculated such that the end portion 15 can be guided out of the fibre composite component 1 at least in portions above the surface 3. In particular, the path and shape of the exposed, severed, embedded optical waveguide 2 after being guided out of the fibre composite component 1 approximately corresponds to a so-called harmonic S path. In other words, the path of the embedded optical waveguide 2 after being guided out of the fibre composite component 1 preferably corresponds to the path of a Gaussian error function. The embedded optical waveguide 2 which has been guided out is shown in dashed lines in FIG. 7. An end face 14 of the end portion 15 of the embedded optical waveguide 2 can then be further processed, for example polished or subjected to a chemical treatment. The surface quality of the end face 14 after the severing step is preferably configured such that further finishing is unnecessary. An expansion of the recess 25 in the fibre composite component 1 is preferably configured such that the end portion 15 of the embedded optical waveguide 2 can be conveniently guided out or bent above the surface 3 to connect with the external optical waveguide 11.

In a step S6, the end portion 15 of the severed, embedded optical waveguide 2 and an end portion 16 of the external optical waveguide 11 are aligned relative to one another. Step S6 can include a bending up and guiding operation of at least portions of the end portion 15 out of the fibre composite component 1. In this respect, the end portions 15, 16 are preferably aligned relative to one another such that the centre axis 13 of the end portion 15 of the embedded optical waveguide 2 and a centre axis 17 of the end portion 16 of the external optical waveguide are arranged collinearly to one another and the end face 14 of the end portion 15 of the embedded optical waveguide 2 is preferably in contact with an end face 18 of the end portion 16 of the external optical waveguide 11. When the end portion 15 of the severed, embedded optical waveguide 2 and the end portion 16 of the external optical waveguide 11 are aligned relative to one another, a beam of light 28 is fed into one of the two optical waveguides 2, 11, for example. The beam of light 28 is at least partly reflected, according to FIG. 8, at an interface 19 formed by the end faces 14, 18 of the end portions 15, 16. When there is an optimal alignment of the end portions 15, 16 of the optical waveguides 2, 11, a minimum reflection of the light beam 28 occurs at the interface 19. It is thus possible to check the optimal alignment of the end portions 15, 16 relative to one another. The end portions 15, 16 of the optical waveguides 2, 11 are aligned relative to one another in particular by an alignment tool 20 which is shown by way of example in FIG. 9 and is configured, for example as a substrate 21 with a V-shaped groove 22. The V-shaped groove 22 of the alignment tool is configured for receiving at least in portions the end portions 15, 16 of the optical waveguides 2, 11. Thus, an optimal alignment of the end portions 15, 16 of the optical waveguides 2, 11 relative to one another is ensured.

In step S7, the mutually aligned end portions 15, 16 of the optical waveguides 2, 11 are spliced together. The mutually aligned end portions 15, 16 of the optical waveguides 2, 11 are preferably spliced together by a fusion splicing method. In this method, the end portions 15, 16 are fused together.

In an alternative embodiment of the method, the embedded optical waveguide 2 can be severed before it is exposed at least in portions. For this purpose, the embedded waveguide 2 is preferably woven into the fibrous tissue 9. When the severed, embedded optical waveguide 2 is exposed, due to an interaction with fibres of the fibrous tissue 9 which surround the embedded optical waveguide 2 and are woven therewith, the optical waveguide 2 will project out of the fibre composite component 1 at a specific angle. This allows a simple alignment and splicing of the optical waveguides 2, 11.

By means of the method described above, it is possible to couple in any nodal positions an external optical waveguide 11 with an optical waveguide 2 embedded in the fibre composite component 1. Due to the fact that, for example a large number of embedded optical waveguides 2 is provided in the fibre composite component 1, an integrated optical waveguide network which can be expanded at any time and can be individually adapted to requirements can be conveniently realised with a low weight.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method for connecting an optical waveguide embedded in a fibre composite component, in particular of an aircraft and spacecraft, to an external optical waveguide, comprising the following steps:

ascertaining a path of the embedded optical waveguide in the fibre composite component;

determining a nodal position at which the embedded optical waveguide is to be coupled with the external optical waveguide;

exposing, at least in portions, the embedded optical waveguide at the nodal position by removing at least part of the fibre composite component around the embedded optical waveguide;

severing the exposed embedded optical waveguide;

aligning relative to each other an end portion of the severed, embedded optical waveguide and an end portion of the external optical waveguide, wherein depending on the depth of the embedded optical waveguide in the fibre composite component, the path of the embedded optical waveguide in the fibre composite component is ascertained non-destructively, wherein the non-destructive methods of ascertainment comprise at least one of an optical method, a digital shearography method, an ultrasound method, an X-ray method, and an interferometric method; and splicing the mutually aligned end portions of the optical waveguides.

2. The method according to claim 1, wherein the embedded optical waveguide is exposed at least in portions by a method which only strips the fibre composite component and does not exert a stripping effect on the embedded optical waveguide.

3. The method according to claim 2, wherein the embedded optical waveguide is exposed at least in portions by laser irradiation.

4. The method according to claim 2, wherein the embedded optical waveguide is exposed at least in portions infrared laser irradiation.

5. The method according to claim 1, wherein the exposed, embedded optical waveguide is severed vertically to a center axis of the embedded optical waveguide.

6. The method according to claim 1, wherein the exposed, embedded optical waveguide is severed by laser irradiation.

7. The method according to claim 1, wherein the exposed, embedded optical waveguide is severed by ultraviolet laser irradiation.

8. The method according to claim 1, wherein the end portion of the severed, embedded optical waveguide and the end portion of the external optical waveguide are aligned relative to each other such that center axes of the end portions are arranged collinearly to each other and that the end faces of the end portions are in contact with each other.

9. The method according to claim 8, wherein, when the end portion of the severed, embedded optical waveguide and the end portion of the external optical waveguide are aligned relative to each other, a beam of light is fed into one of the optical waveguides and is at least partly reflected at an interface, formed by the end faces of the end portions, of the optical waveguides, and when the end portions of the optical waveguides are aligned optimally relative to each other, a minimum reflection of the light beam occurs at the interface.

10. The method according to claim 8, wherein the end portions of the optical waveguides are aligned relative to each other by an alignment tool.

11. The method according to claim 8, wherein the end portions of the optical waveguides are aligned relative to each other by an alignment tool having a substrate with a V-shaped groove which receives at least in portions at least one of the end portions of the optical waveguides.

12. The method according to claim 1, wherein the mutually aligned end portions of the optical waveguides are spliced by fusion splicing.

13. The method according to claim 1, wherein at least one of the embedded optical waveguide and the external optical waveguide is configured as at least one of optical fibres and as an arrangement of a large number of optical fibres.

14. The method according to claim 1, wherein the embedded optical waveguide is woven into a laminate layer of the fibre composite component.

* * * * *